US012229750B2

(12) United States Patent
Sneider et al.

(10) Patent No.: US 12,229,750 B2
(45) Date of Patent: Feb. 18, 2025

(54) SYSTEMS AND METHODS FOR GENERATING AND USING VIRTUAL CARD NUMBERS

(71) Applicant: Capital One Services, LLC, McLean, VA (US)

(72) Inventors: Amanda Sneider, New York, NY (US); Allison Fenichel, Brooklyn, NY (US); Varun Gupta, Brooklyn, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/518,607

(22) Filed: Nov. 4, 2021

(65) Prior Publication Data

US 2023/0140712 A1 May 4, 2023

(51) Int. Cl.
*G06Q 20/34* (2012.01)
*G06Q 20/40* (2012.01)
*G06Q 30/0601* (2023.01)

(52) U.S. Cl.
CPC ....... *G06Q 20/351* (2013.01); *G06Q 20/4015* (2020.05); *G06Q 30/0603* (2013.01)

(58) Field of Classification Search
CPC ............. G06Q 20/351; G06Q 20/4015; G06Q 30/0603
USPC .......................................................... 705/41
See application file for complete search history.

(56) References Cited

U.S. PATENT DOCUMENTS

| | | |
|---|---|---|
| 8,538,827 B1 | 9/2013 | Dryer et al. |
| 11,023,888 B2 * | 6/2021 | Wang .................. G06Q 20/102 |
| 11,468,467 B1 * | 10/2022 | Wargo ................ G06Q 20/3276 |
| 2014/0019352 A1 * | 1/2014 | Shrivastava ........... G06Q 20/02 705/41 |
| 2015/0220951 A1 | 8/2015 | Kurapati et al. |

(Continued)

FOREIGN PATENT DOCUMENTS

WO    WO-2013006725 A3 *   1/2013    ............. G06Q 20/16

OTHER PUBLICATIONS

Porter at al. Timestamp prefix carving for filesystem metadata extraction. Forensic Science International: Digital Investigation. 38 (2021) 301266. (Year: 2021).*

(Continued)

*Primary Examiner* — Virpi H Kanervo
(74) *Attorney, Agent, or Firm* — TROUTMAN PEPPER LOCKE LLP; Christopher J. Forstner; John A. Morrissett

(57) ABSTRACT

A system may receive a first timestamp associated with first click data at a first website associated with a first merchant, a first referring URL, and a first checkout URL, responsive to the user device navigating to the first checkout URL via the first referring URL, determine whether the first referring URL and the first checkout URL have first domains that respectively match previous domains of a previous referring URL and a previous checkout URL beyond a predetermined matching threshold, and based on the first referring URL and the first checkout URL having the first domains that respectively match the previous domains of the previous referring URL and the previous checkout URL beyond the predetermined matching threshold, cause the web browser plugin of the user device to display, in a dynamic GUI, a first virtual card number associated with the previous domains to complete a first transaction.

20 Claims, 5 Drawing Sheets

(56) References Cited

U.S. PATENT DOCUMENTS

| | | | | |
|---|---|---|---|---|
| 2018/0315069 | A1* | 11/2018 | Kamireddy | G06Q 30/0633 |
| 2019/0361845 | A1* | 11/2019 | Faith | G06Q 50/01 |
| 2021/0073819 | A1* | 3/2021 | Hernandez | G06Q 20/3224 |
| 2022/0075877 | A1* | 3/2022 | Helms | G06F 21/602 |

OTHER PUBLICATIONS

Liu, Jun, Robert J. Kauffman, and Dan Ma. "Competition, cooperation, and regulation: Understanding the evolution of the mobile payments technology ecosystem." Electronic Commerce Research and Applications 14.5 (2015): 372-391. (Year: 2015).*

A. Kemper and T. Neumann, "HyPer: A hybrid OLTP&OLAP main memory database system based on virtual memory snapshots," 2011 IEEE 27th International Conference on Data Engineering, Hannover, Germany, 2011, pp. 195-206. (Year: 2011).*

* cited by examiner

SYSTEMS AND METHODS FOR GENERATING AND USING VIRTUAL CARD NUMBERS

FIELD

The disclosed technology relates to systems and methods for generating and using virtual card numbers. In particular, the disclosed technology relates to using click data from a web browser plugin along with transaction data to dictate whether to generate and/or use a previously generated virtual card number.

BACKGROUND

Transaction data (e.g., purchase price or transaction amount, transaction date, and a merchant identifier such as name and/or category) that is traditionally communicated when processing a transaction and included on an account statement contains limited data about the merchant involved in the transaction. The merchant's name and category details inputted by the merchant may be insufficiently descriptive, truncated, or abbreviated. Because of the limited amount of contextual information included in the transaction data, a system recommends a wrong virtual card number causing a transaction to be declined since the virtual card number not bound to the merchant associated with an attempted transaction. Worse yet, a virtual card number may be used for multiple merchants because it is bound to a payment processor (e.g., Shopify®) rather than a merchant creating a fraud risk with a particular virtual card number.

Accordingly, there is a need for enhancing transaction data with additional unique data sources such as click data or browsing data to provide more data for binding a virtual card number to a merchant. Embodiments of the present disclosure are directed to this and other considerations.

SUMMARY

Disclosed embodiments may include a system or method for using click data from a web browser plugin along with transaction data to dictate whether to generate and/or use a previously generated virtual card number. The system may include one or more processors, and memory in communication with the one or more processors and storing first instructions that are configured to cause the system to perform a method for using click data from a web browser plugin along with transaction data to dictate whether to generate and/or use a previously generated virtual card number. For example, the system or method may receive, via a web browser plugin on a user device, a first timestamp associated with first click data at a first website associated with a first merchant (e.g., Nike®), a first referring uniform resource location (URL) (e.g., nike.com/mens), a first checkout URL (e.g., nike.com/checkout), and first user identification data (e.g., a credit card number or username) responsive to the user device navigating to the first checkout URL via the first referring URL. The system may receive first transaction authorization data comprising a second timestamp and second user identification data associated with a first attempted transaction with the first merchant, wherein the second user identification data includes a first virtual card number (e.g., a virtual credit card number). The system may determine whether (i) the first timestamp is within a predetermined period (e.g., 20 minutes) of the second timestamp and (ii) the first user identification data corresponds with the second user identification data (e.g., the first virtual card number is associated or linked to the username). Responsive to determining that the first timestamp is within the predetermined period (e.g., 20 minutes) of the second timestamp and the first user identification data corresponds with the second user identification data, the system may store the first virtual card number associated with the first referring URL and the first checkout URL in a database for later use.

Disclosed embodiments may include a system for using click data from a web browser plugin along with transaction data to dictate whether to generate and/or use a previously generated virtual card number. The system may include one or more processors, and memory in communication with the one or more processors and storing first instructions that are configured to cause the system to perform a method for using click data from a web browser plugin along with transaction data to dictate whether to generate and/or use a previously generated virtual card number. For example, the system may receive, via a web browser plugin on a user device, a first timestamp associated with first click data at a first website associated with a first merchant (e.g., Nike®), a first referring URL (e.g., nike.com/mens), and a first checkout URL (e.g., nike.com/checkout), responsive to the user device navigating to the first checkout URL via the first referring URL. The system may determine whether the first referring URL and the first checkout URL have first domains (e.g., nike.com) that respectively match previous domains of a previous referring URL and a previous checkout URL beyond a predetermined matching threshold. Based on the first referring URL and the first checkout URL having the first domains that respectively match the previous domains of the previous referring URL and the previous checkout URL beyond the predetermined matching threshold, the system may cause the web browser plugin of the user device to display, in a dynamic GUI, a first virtual card number associated with the previous domains to complete a first transaction.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure relate to systems and methods for using click data from a web browser plugin along with transaction data to dictate whether to generate and/or use a previously generated virtual card number. The systems and methods described herein are necessarily rooted in computer technology as they relate to automatically matching click data from a web browser extension with transaction data to enhance/supplement use of a virtual card number. Importantly, examples of the present disclosure provide the capability for providing dynamic graphical user interfaces. Additionally, improve the speed with which computers can determine the correct merchant associated with a transaction and for use with a virtual card number.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1A:
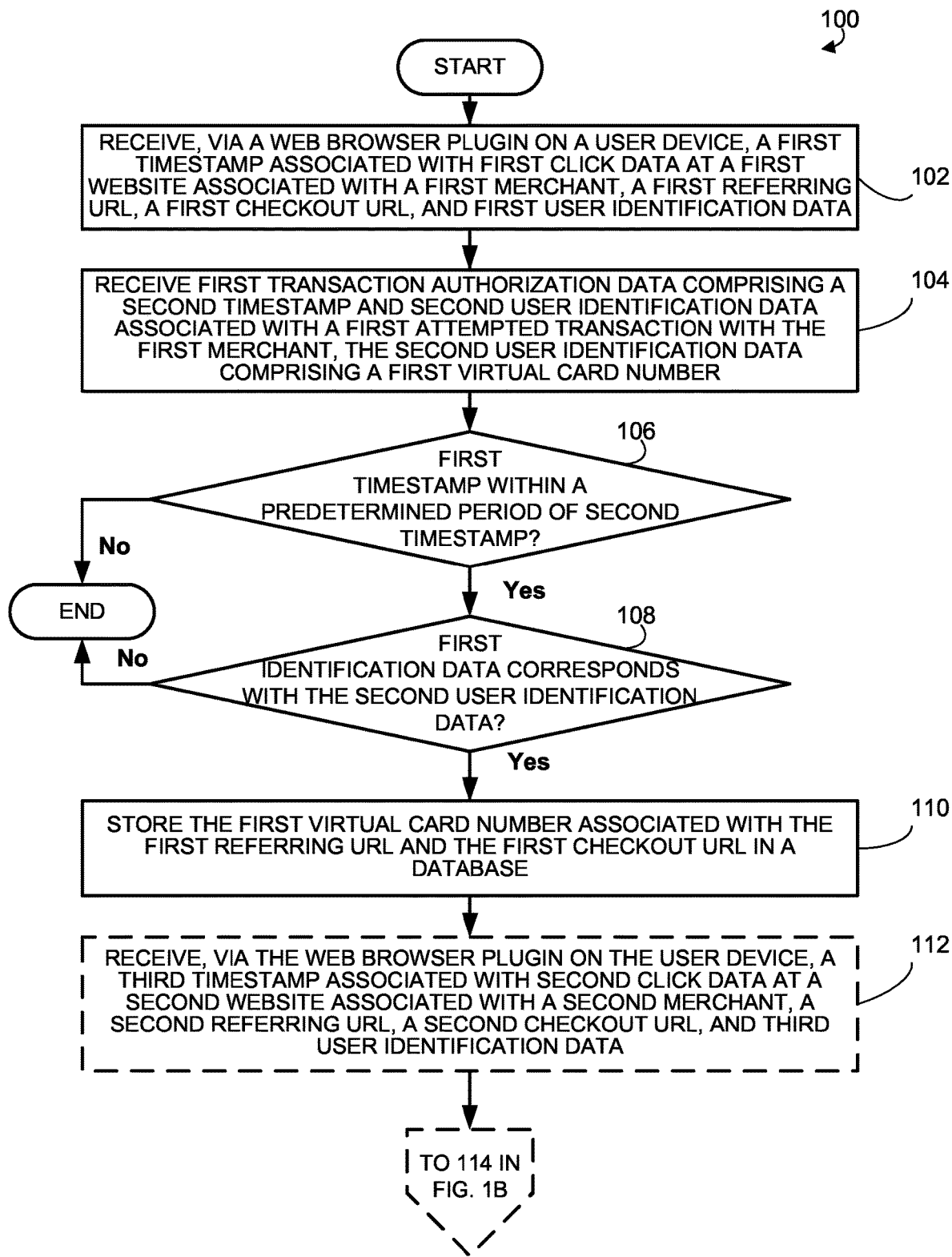
FIGS. 1A and 1B are flow diagrams illustrating an exemplary method for generating and potentially using a virtual card number based on transaction data and click data, in accordance with certain embodiments of the disclosed technology.
Figure 1B:
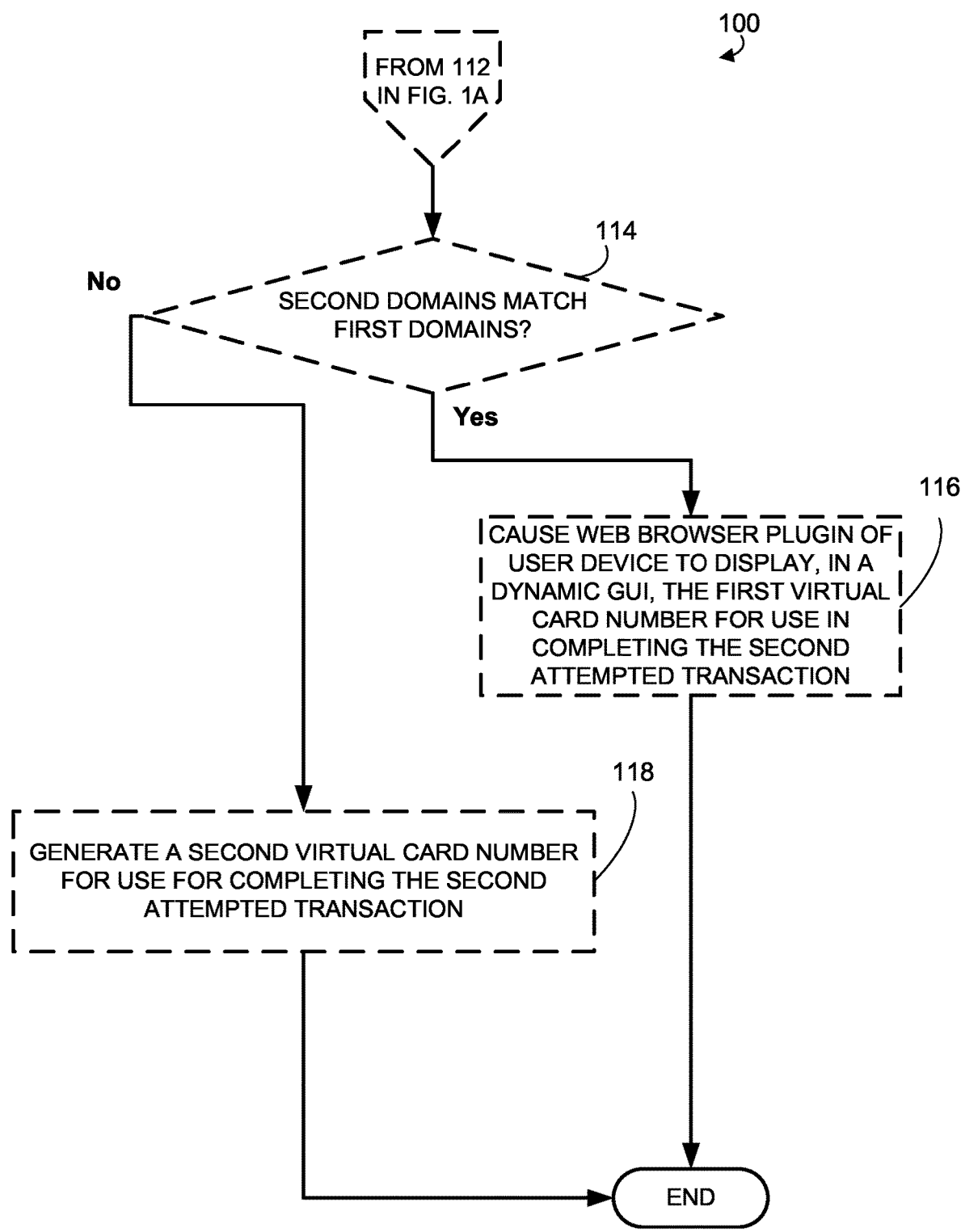

FIGS. 1A and 1B are flow diagrams illustrating an exemplary method for generating and potentially using a virtual card number based on transaction data and click data, in accordance with certain embodiments of the disclosed technology. The steps of method 100 may be performed by one or more components of the system 400 (e.g., merchant matching system 320 or web server 410 of data augmenting system 408 or user device 402), as described in more detail with respect to FIGS. 3 and 4. Although method 100 is described as being performed by the merchant matching system 320, the user device 402 or the web server 410 may perform some similar steps described below in place of or with merchant matching system 320.

In block 102, the merchant matching system 320 may receive, via a web browser plugin on a user device 402, a first timestamp associated with first click data at a website associated with a first merchant, a first referring uniform resource location (URL), a first checkout URL, and first user identification data. For example, a user device 402 may navigate to a checkout URL (e.g., a checkout URL) from a referring URL. In some cases, the referring URL and the checkout URL may correspond to the same entity or merchant (e.g., Apple®). Other times, the referring URL may correspond to a merchant (e.g., a small business or a grocery store) and the checkout URL may correspond to a payment processor (e.g., Shopify) that facilitates the processing of shipping and payment information to the merchant. The first timestamp may correspond with the user accessing the current or checkout URL with the user device 402, which may be detected by the web browser plugin residing on the user device and at least partially controlled by the merchant matching system 320. The first click data does not necessarily have to involve clicking anything on the webpage associated with the first checkout URL.

In block 104, the merchant matching system 320 may receive first transaction authorization data including a second timestamp and second user identification data. The second user identification data may include a first virtual card number. For example, the first transaction authorization may be associated with an attempted or pending transaction.

In block 106, the merchant matching system 320 may determine whether the first timestamp is within a predetermined period of the second timestamp. For example, the first timestamp may be Jun. 11, 2021 at 11:01 am EST, the second timestamp may be Jun. 11, 2021 at 11:20 am EST, and the predetermined period may be 30 minutes. Thus, the merchant matching system 420 may determine that the first timestamp is within the predetermined period of the second timestamp.

When the merchant matching system 320 determines that the first timestamp is within the predetermined period of the second timestamp, the merchant matching system 320 may proceed to block 108. When the merchant matching system 320 determines that the first timestamp is not within the predetermined period of the second timestamp, the merchant matching system 420 may end the processing.

In block 108, the merchant matching system 320 may determine whether the first user identification data corresponds with the second user identification data. For example, the first user identification may be an account number associated with the user and the second user identification data may also be the same account number associated with the user. In other examples, the first user identification data and/or the second user identification data may include a user's name, one or more phone numbers, one or more account numbers, one or more addresses, one or more email addresses, a birth date, a user name and password work linked to the one or more account numbers.

Moreover, the first user identification data may correspond with the second user identification data when they match beyond a predetermined matching threshold. For example, the first user identification data may include single sign on identification (SSOID) which is linked to one or more account numbers. The second user identification data may simply be a single account number that matches the one or more account numbers linked to the SSOID of the user. Thus, while the SSOID does not directly match the single account number, the SSOID shares associated identification data that does match. Therefore, the merchant matching system 320 may determine that the first user identification data and the second user identification data corresponds.

When the merchant matching system 320 determines that the first user identification data and the second user identification data corresponds, the merchant matching system 320 may proceed to block 110. When the merchant matching system 320 determines that the first user identification data and the second user identification data do not correspond (e.g., they do not include or are not related to the same account number), the merchant matching system 320 may end processing.

In block 110, the merchant matching system 320 may generate and store a first virtual card number associated with the first referring URL and the first checkout URL in a database. For example, the merchant matching system 320 may generate and associate/link a virtual card number with one of the user's (e.g., credit) account(s). Then, the user may store the generated virtual card number in the database (e.g., database 360 and/or 416).

In optional block 112, the merchant matching system 320 may receive, via the web browser plugin on the user device 402, a third timestamp associated with second click data at a second website associated with a second merchant, a second referring URL, a second checkout URL, and third user identification data responsive to the user device navigating to the second checkout URL via the second referring URL. For example, the user may revisit the same merchant website to make another purchase and the web browser plugin installed on the user device 402 may detect the checkout page and send the associated click data to the merchant matching system 320.

In optional block 114, the merchant matching system 320 may determine whether the second referring URL and the second checkout URL have second domains that respectively match first domains of the first referring URL and the first checkout URL beyond a predetermined matching threshold. When the merchant matching system 320 determines that the second domains match the first domains, the method may proceed to block 116. When the merchant matching system 320 determines that the second domains do not match the first domains, the method may proceed to block 118. For example, the second referring URL (e.g., "www.apple.com/iphone") and the second checkout URL (e.g., "www.apple.com/checkout") may have identical second domains (e.g., "apple.com") and match the first domains of "apple.com" corresponding to the first referring URL (e.g., "www.apple.com/ipad") and first referring checkout URL (e.g., "www.apple.com/checkout"). Alternatively, the second referring URL (e.g., "www.allbirds.com.com/mens") may have a second domain of "allbirds.com" and the second checkout URL (e.g., "www.shopify.com/checkout") may have a second domain of "shopify.com" that do not match the first domains of "apple.com" corresponding to the first referring URL (e.g., "www.apple.com/ipad") and first referring checkout URL (e.g., "www.apple.com/checkout").

In optional block 116, the merchant matching system 320 may cause the web browser plugin of the user device to display, in a dynamic GUI, the first virtual card number for use in completing a second attempted transaction. For example, the user may select the previously used virtual card number to complete the transaction.

In optional block 118, the merchant matching system 320 may generate a second virtual card number for use for completing the second attempted transaction. For example, the merchant matching system 320 may generate a virtual card number for allbirds.com as a corresponding referring URL and shopify.com as a corresponding checkout URL.

In some embodiments, responsive to determining that the first timestamp is not within the predetermined period of the second timestamp or the first user identification data does not correspond with the second user identification data, the merchant matching system 320 may classify the second attempted transaction as a card-on-file transaction and update the dynamic GUI to include a card-on-file indication.

In some embodiments, the merchant matching system may cause the web browser plugin on the user device 402 to transmit the first timestamp, the referring URL, the first checkout URL and the first user identification data in response to identifying one or more payment fields on a web page associated with the first checkout URL. The first user identification data and/or the third user identification data may include single sign on identification data (SSOID) (e.g., username and password) whereas the second and forth user identification data may include the second user identification data comprises an account number, a name, and/or an address associated with a first user and the first attempted transaction.

Figure 2:
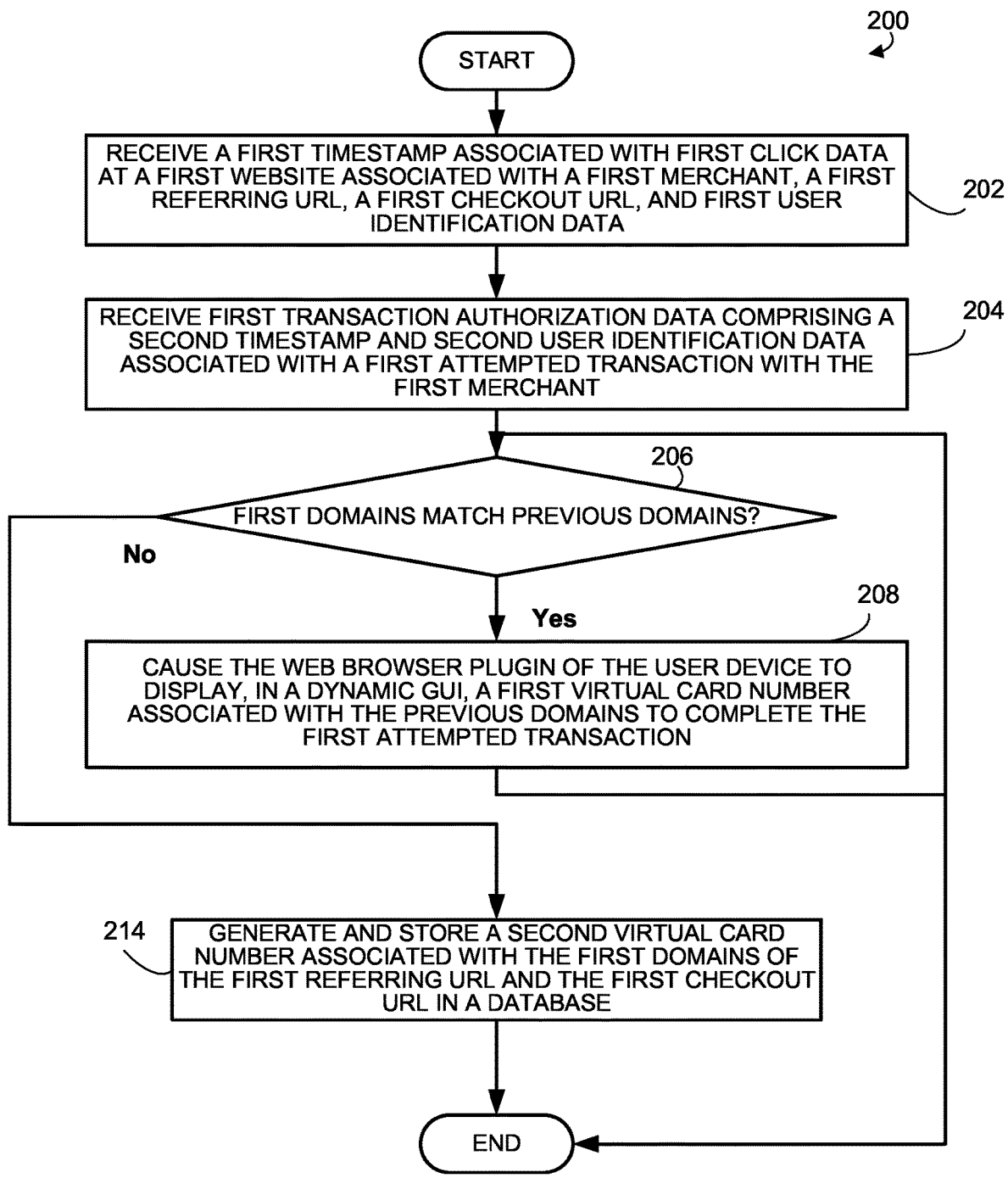
FIG. 2 is a flow diagram illustrating an exemplary method for using click data and transaction data to determine whether to use a previously generated virtual card number in accordance with certain embodiments of the disclosed technology.

FIG. 2 is a flow diagram illustrating an exemplary method for using click data and transaction data to determine whether to use a previously generated virtual card number in accordance with certain embodiments of the disclosed technology. The steps of method 200 may be performed by one or more components of the system 400 (e.g., merchant matching system 320 or web server 410 of data augmenting system 408 or user device 402), as described in more detail with respect to FIGS. 4 and 5.

In block 202, the merchant matching system 320 may receive, via a web browser plugin on a user device, a first timestamp associated with first click data at a first website associated with a first merchant, a first referring URL, and a first checkout URL, responsive to the user device navigating to the first checkout URL via the first referring URL.

In block 204, the merchant matching system 320 may determine whether the first referring URL and the first checkout URL have first domains that respectively match previous domains of a previous referring URL and a previous checkout URL beyond a predetermined matching threshold.

In block 206, the merchant matching system 320 may, based on the first referring URL and the first checkout URL having the first domains that respectively match the previous domains of the previous referring URL and the previous checkout URL beyond the predetermined matching threshold, cause the web browser plugin of the user device to display, in a dynamic GUI, a first virtual card number associated with the previous domains to complete a first transaction.

In some embodiments, based on the first referring URL or the first checkout URL having the first domains that do not respectively match the previous domains of the previous referring URL and the previous checkout URL beyond the predetermined matching threshold, the merchant matching system 320 may generate a second virtual card number associated with the first domains of the first referring URL and the first checkout URL and cause the dynamic GUI to display the second virtual card number to complete the first attempted transaction.

In some embodiments, the merchant matching system 320 may cause the web browser plugin on the user device to transmit the first timestamp, the first referring URL, the first checkout URL and the first user identification data in response to identifying one or more payment fields on a web page associated with the first checkout URL.

In some embodiments, the merchant matching system 320 may receive, via the web browser plugin, first user identification data and a first timestamp associated with the user navigating the user device to the first checkout URL, receive an attempted transaction with associated attempted transaction data comprising the first virtual card number and a second timestamp, determine whether (i) the first timestamp is within a predetermined period of the second timestamp, (ii) the first user identification data corresponds with the first virtual card number, and (iii) the first referring URL and the first checkout URL have first domains that respectively match previous domains of the previous referring URL and the previous checkout URL beyond a predetermined matching threshold, and responsive to determining that (i) the first timestamp is not within the predetermined period of the second timestamp, (ii) the first user identification data does not correspond with the first virtual card number, or (iii) the first referring URL and the first checkout URL have first domains that do not respectively match previous domains of the previous referring URL and the previous checkout URL beyond a predetermined matching threshold, decline the attempted transaction.

In some embodiments, the first user identification data may include single sign on identification data (SSOID) (e.g., username and password). In some embodiments, the previous referring URL and the previous checkout URL are retrieved from a database.

Figure 3:
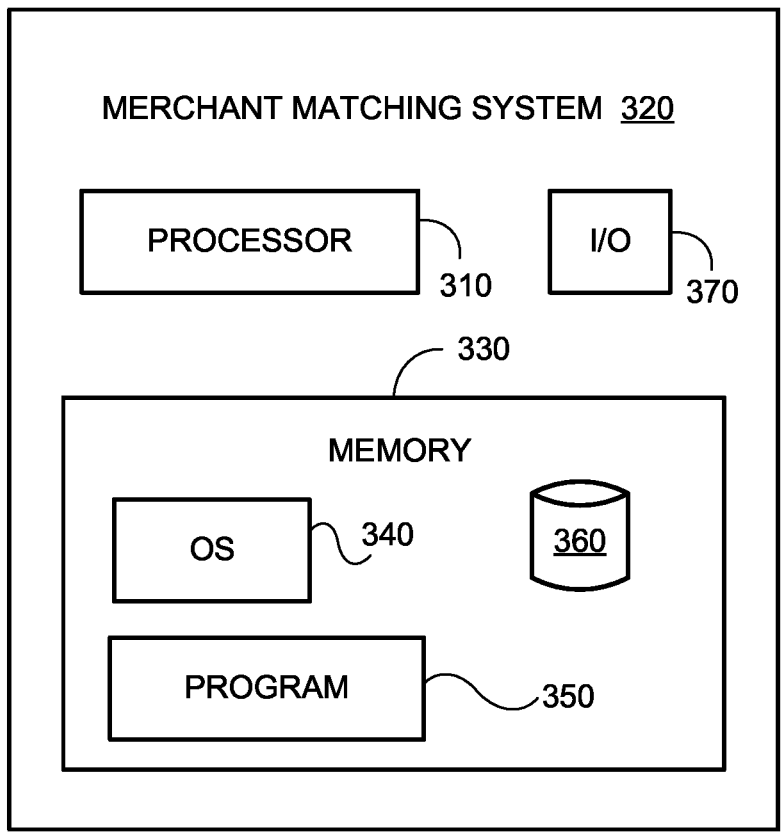
FIG. 3 is a block diagram of an example merchant matching system used to match click data with transaction data in order to determine whether to generate or use a virtual card number, according to an example implementation of the disclosed technology.
Figure 4:
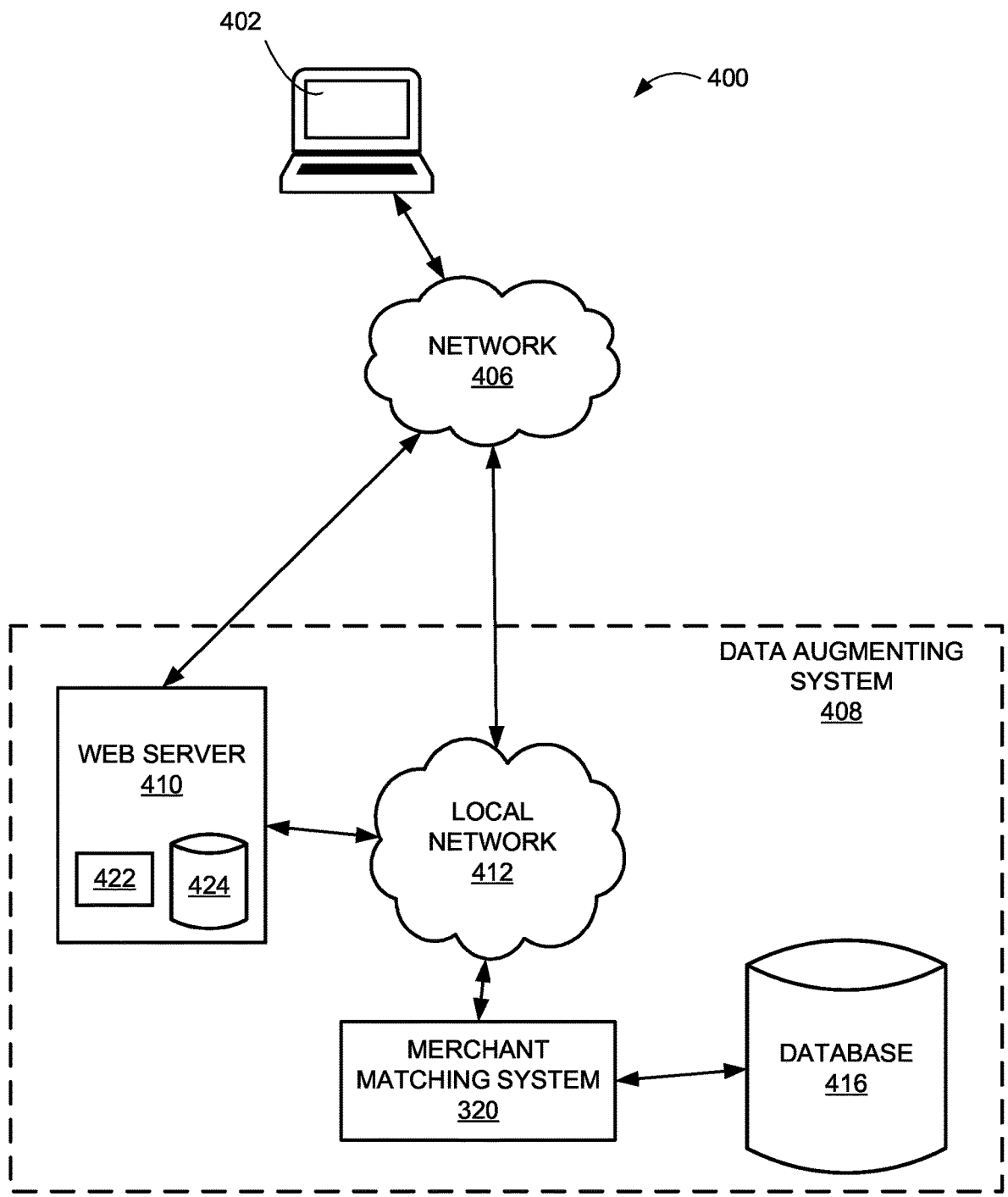
FIG. 4 is a block diagram of an example system that may be used to match click data with transaction data in order to determine whether to generate or use a virtual card number, according to an example implementation of the disclosed technology.

FIG. 3 is a block diagram of an example merchant matching system 320 used to match click data with transaction data, according to an example implementation of the disclosed technology. According to some embodiments, the user device 402 and web server 410, as depicted in FIG. 4 and described below, may have a similar structure and components that are similar to those described with respect to merchant matching system 320 shown in FIG. 3. As shown, the merchant matching system 320 may include a processor 310, an input/output ("I/O") device 370, a memory 330 containing an operating system ("OS") 340 and a program 350. In certain example implementations, the merchant matching system 320 may be a single server or may be configured as a distributed computer system including multiple servers or computers that interoperate to perform one or more of the processes and functionalities associated with the disclosed embodiments. In some embodiments, merchant matching system 320 may be one or more servers from a serverless or scaling server system. In some embodiments, the merchant matching system 320 may further include a peripheral interface, a transceiver, a mobile network interface in communication with the processor 310, a bus configured to facilitate communication between the various components of the merchant matching system 320, and a power source configured to power one or more components of the merchant matching system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig-Bee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 410 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Pentium™ family manufactured by Intel™ or the Turion™ family manufactured by AMD™. The processor 310 may constitute a single core or multiple core processor that executes parallel processes simultaneously. For example, the processor 310 may be a single core processor that is configured with virtual processing technologies. In certain embodiments, the processor 310 may use logical processors to simultaneously execute and control multiple processes. The processor 310 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the merchant matching system 320 may include one or more storage devices configured to store information used by the processor 310 (or other components) to perform certain functions related to the disclosed embodiments. In one example, the merchant matching system 420 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the merchant matching system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the merchant matching system 320 may include the memory 330 that may include one or more programs 350 to perform one or more functions of the disclosed embodiments.

The processor 310 may execute one or more programs located remotely from the merchant matching system 320.

For example, the merchant matching system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a merchant matching database 360 for storing related data to enable the merchant matching system 320 to perform one or more of the processes and functionalities associated with the disclosed embodiments.

The merchant matching database 360 may include stored data relating to one or more merchants and virtual card numbers. According to some embodiments, the functions provided by the merchant matching database 360 may also be provided by a database that is external to the merchant matching system 320, such as the database 416 as shown in FIG. 4.

The merchant matching system 320 may also be communicatively connected to one or more memory devices (e.g., databases) locally or through a network. The remote memory devices may be configured to store information and may be accessed and/or managed by the merchant matching system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The merchant matching system 320 may also include one or more I/O devices 370 that may comprise one or more interfaces for receiving signals or input from devices and providing signals or output to one or more devices that allow data to be received and/or transmitted by the merchant matching system 320. For example, the merchant matching system 320 may include interface components, which may provide interfaces to one or more input devices, such as one or more keyboards, mouse devices, touch screens, track pads, trackballs, scroll wheels, digital cameras, microphones, sensors, and the like, that enable the merchant matching system 320 to receive data from a user (such as, for example, via the user device 402).

In example embodiments of the disclosed technology, the merchant matching system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the merchant matching system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the merchant matching system 320 may include a greater or lesser number of components than those illustrated.

FIG. 4 is a block diagram of an example system that may be used to match click data with transaction data in order to determine whether to generate or use a virtual card number, according to an example implementation of the disclosed technology. The components and arrangements shown in FIG. 4 are not intended to limit the disclosed embodiments as the components used to implement the disclosed processes and features may vary. As shown, data augmenting system 408 may interact with a user device 402 via a network 406. In certain example implementations, the data augmenting system 408 may include a local network 412, a merchant matching system 320, a web server 410, and a database 416.

In some embodiments, a user may operate the user device 402. The user device 402 can include one or more of a mobile device, smart phone, general purpose computer, tablet computer, laptop computer, telephone, PSTN landline, smart wearable device, voice command device, other mobile computing device, or any other device capable of communicating with the network 406 and ultimately communicating with one or more components of the data sugmenting system 408. In some embodiments, the user device 402 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the data augmenting system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network using a public network, and/or other suitable connection(s) that enable(s) components in the system 400 environment to send and receive information between the components of the system 400. The network 406 may also include a public switched telephone network ("PSTN") and/or a wireless network.

The data augmenting system 408 may be associated with and optionally controlled by one or more entities such as a business, corporation, individual, partnership, or any other entity that provides one or more of goods, services, and consultations to individuals such as customers. In some embodiments, the data augmenting system 408 may be controlled by a third party on behalf of another business, corporation, individual, partnership. The data augmenting system 408 may include one or more servers and computer systems for performing one or more functions associated with products and/or services that the organization provides.

Web server 410 may include a computer system configured to generate and provide one or more websites accessible to customers, as well as any other individuals involved in data augmenting system's 408 normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems (e.g., merchant matching system 320) of system 400. In some embodiments, web server 410 may host websites or applications that may be accessed by the user device 402. For example, web server 410 may host a financial service provider website that a user device may access by providing an attempted login that are authenticated by the merchant matching system 320. According to some embodiments, web server 410 may include software tools, similar to those described with respect to user device 402 above, that may allow web server 410 to obtain network identification data from user device 402.

The local network 412 may include any type of computer networking arrangement used to exchange data in a localized area, such as WiFi, Bluetooth™ Ethernet, and other suitable network connections that enable components of the data augmenting system 408 to interact with one another and to connect to the network 506 for interacting with components in the system 400 environment. In some embodiments, the local network 412 may include an interface for communicating with or linking to the network 406. In other embodiments, certain components of the data augmenting system 408 may communicate via the network 406, without a separate local network 406.

In accordance with certain example implementations of the disclosed technology, the data augmenting system 408 may include one or more computer systems configured to compile data from a plurality of sources the merchant matching system 320, web server 410, and/or the database 416. The merchant matching system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Although the preceding description describes various functions of a web server 410, a merchant matching system 320, and a database 416, in some embodiments, some or all of these functions may be carried out by a single computing device or a plurality of computing devices in a (cloud) serverless system.

EXEMPLARY USE CASE

A user navigates his user device's 402 to allbirds.com and finds a pair of shoes to purchase with a web browser plug-in (running on the user device 402) monitoring the website navigation. The user selects the pair of shoes and clicks the checkout button, which directs the web browser to checkout page on a Shopify® website (e.g., shopify.com/checkout). On the checkout page, the user enters his credit card information and clicks submit to complete the purchase. The bank associated with the user's credit card employs a merchant matching system 320 to enhance transaction details for its customers that use the browser plugin. The merchant matching system 320 receives, via the web browser plugin on a user device, a first timestamp (e.g., 12:01 pm EST on Sep. 12, 2021) associated with first click data (browsing data) at allbirds.com, a first referring uniform resource location (URL) (e.g., allbirds.com/mens), a first checkout URL (e.g., shopify.com/checkout), and first user identification data (e.g., credit card number or user name). The merchant matching system 420 receives transaction data including a second timestamp (e.g., 12:02 pm EST on Sep. 12, 2021), second user identification data (e.g., a virtual card number), and a first merchant name (e.g., Shopify®) associated with the transaction. The merchant matching system 320 determines whether the first timestamp is within a predetermined period (e.g., 20 minutes) of the second timestamp and determine whether the first user identification data corresponds (e.g., matches, partially matches, or has partially matching linked data) with the second user identification data. The merchant matching system 320 determines that the first timestamp is within the predetermined period of the second timestamp and the first user identification data corresponds with the second user identification data. In response, the merchant matching system 320 stores the first virtual card number with the referring URL (e.g., allbirds.com/mens) and the checkout URL (e.g., shopify.com/checkout).

When the user visits the same website with their user device 402, the merchant matching system 320 may receive, via the web browser plugin on the user device 402, a third timestamp associated with second click data, a second referring URL (e.g., allbirds.com/womens), a second checkout URL (e.g., shopify.com/checkout), and a third user identification data (e.g., credit card number or user name). The merchant matching system 320 may determine whether domains of the first referring URL and the first checkout URL respectively match the domains of the second referring URL and the second checkout URL beyond a predetermined matching threshold. The merchant matching system 320 matching system may determine that the respective domains of the referring and checkout URLs match beyond predetermined matching threshold. In response, the merchant matching system 320 may cause the web browser plugin of the user device 402 to display, in a dynamic GUI, the first virtual card number for use in completing a second attempted transaction. For example, the dynamic GUI may display "suggested virtual card number" (e.g., the first virtual card number) that prepopulates the credit card fields on the website once selected with the suggested number, expiration date, and security code. In other examples, the dynamic GUI may remove all other virtual card numbers from a list and only present the "suggested virtual card number."

Here, because the first virtual card number is bound or associated with the at least the domain of the first referring URL and possibly the domain of the first checkout URL, the first virtual card number avoids being simply associated with the domain of the first checkout URL (e.g., shopify.com/checkout). Thus, the first virtual card number may only be used when the domain of the first referring URL is allbirds.com as opposed to shopify.com, which could be used for many different merchants so long as the merchant uses Shopify® as their checkout/payment processor. Therefore, if a hacker gets a hold of a the first virtual card number they could only use the number at allbirds.com otherwise any attempted purchase with a different referring URL domain would be denied.

In some examples, disclosed systems or methods may involve one or more of the following clauses:

Clause 1: A system comprising: one or more processors; and memory in communication with the one or more processors and storing instructions that, when executed by the one or more processors, are configured to cause the system to: receive, via a web browser plugin on a user device, a first timestamp associated with first click data at a first website associated with a first merchant, a first referring uniform resource location (URL), a first checkout URL, and first user identification data responsive to the user device navigating to the first checkout URL via the first referring URL; receive first transaction authorization data comprising a second timestamp and second user identification data associated with a first attempted transaction with the first merchant, wherein the second user identification data comprising a first virtual card number; determine whether (i) the first timestamp is within a predetermined period of the second timestamp and (ii) the first user identification data corresponds with the second user identification data; and responsive to determining that the first timestamp is within the predetermined period of the second timestamp and the first user identification data corresponds with the second user identification data, store the first virtual card number associated with the first referring URL and the first checkout URL in a database.

Clause 2: The system of clause 1, wherein the instructions are further configured to cause the system to: receive, via the web browser plugin on the user device, a third timestamp associated with second click data at a second website associated with a second merchant, a second referring URL, a second checkout URL, and third user identification data responsive to the user device navigating to the second checkout URL via the second referring URL; determine whether the second referring URL and the second checkout URL have second domains that respectively match first domains of the first referring URL and the first checkout URL beyond a predetermined matching threshold; and based on the second referring URL and the second checkout URL having the second domains that respectively match the first domains of the first referring URL and the first checkout URL beyond the predetermined matching threshold, cause the web browser plugin of the user device to display, in a dynamic GUI, the first virtual card number for use in completing a second attempted transaction; and based on the second referring URL or the second checkout URL having the second domains that do not respectively match the first domains of the first referring URL and the first checkout URL beyond the predetermined matching threshold, generate a second virtual card number for use for completing the second attempted transaction.

Clause 3: The system of clause 2, wherein the instructions are further configured to cause the system to: responsive to determining that the first timestamp is not within the predetermined period of the second timestamp or the first user identification data does not correspond with the second user identification data, classify the second attempted transaction as a card-on-file transaction and update the dynamic GUI to include a card-on-file indication.

Clause 4: The system of clause 2, wherein the instructions are further configured to cause the system to: cause the web browser plugin on the user device to transmit the first timestamp, the referring URL, the first checkout URL and the first user identification data in response to identifying one or more payment fields on a web page associated with the first checkout URL.

Clause 5: The system of clause 2, wherein the first user identification data comprises single sign on identification data (SSOID).

Clause 6: The system of clause 5, wherein the third user identification data comprises the SSOID.

Clause 7: The system of clause 6, wherein the second user identification data comprises an account number, a name, and/or an address associated with a first user and the first attempted transaction.

Clause 8: The system of clause 7, wherein the fourth user identification data comprises the account number, the name, and/or the address associated with the first user and the second attempted transaction.

Clause 9: A system comprising: one or more processors; and memory in communication with the one or more processors and storing instructions that, when executed by the one or more processors, are configured to cause the system to: receive, via a web browser plugin on a user device, a first timestamp associated with first click data at a first website associated with a first merchant, a first referring URL, and a first checkout URL, responsive to the user device navigating to the first checkout URL via the first referring URL; determine whether the first referring URL and the first checkout URL have first domains that respectively match previous domains of a previous referring URL and a previous checkout URL beyond a predetermined matching threshold; and based on the first referring URL and the first checkout URL having the first domains that respectively match the previous domains of the previous referring URL and the previous checkout URL beyond the predetermined matching threshold, cause the web browser plugin of the user device to display, in a dynamic GUI, a first virtual card number associated with the previous domains to complete a first transaction.

Clause 10: The system of clause 9, wherein the instructions are further configured to cause the system to: based on the first referring URL or the first checkout URL having the first domains that do not respectively match the previous domains of the previous referring URL and the previous checkout URL beyond the predetermined matching threshold, generate a second virtual card number associated with the first domains of the first referring URL and the first checkout URL and cause the dynamic GUI to display the second virtual card number to complete the first attempted transaction.

Clause 11: The system of clause 9, wherein the instructions are further configured to cause the system to: cause the web browser plugin on the user device to transmit the first timestamp, the first referring URL, the first checkout URL and the first user identification data in response to identifying one or more payment fields on a web page associated with the first checkout URL.

Clause 12: The system of clause 9, wherein the instructions are further configured to cause the system to: receive, via the web browser plugin, first user identification data and a first timestamp associated with the user navigating the user device to the first checkout URL;

receive an attempted transaction with associated attempted transaction data comprising the first virtual card number and a second timestamp; determine whether (i) the first timestamp is within a predetermined period of the second timestamp, (ii) the first user identification data corresponds with the first virtual card number, and (iii) the first referring URL and the first checkout URL have first domains that respectively match previous domains of the previous referring URL and the previous checkout URL beyond a predetermined matching threshold; and responsive to determining that (i) the first timestamp is not within the predetermined period of the second timestamp, (ii) the first user identification data does not correspond with the first virtual card number, or (iii) the first referring URL and the first checkout URL have first domains that do not respectively match previous domains of the previous referring URL and the previous checkout URL beyond a predetermined matching threshold, decline the attempted transaction.

Clause 13: The system of clause 12, wherein the first user identification data comprises single sign on identification data (SSOID).

Clause 14: The system of clause 9, wherein the previous referring URL and the previous checkout URL are retrieved from a database.

Clause 15: A method, comprising: receiving, via a web browser plugin on a user device, a first timestamp associated with first click data at a first website associated with a first merchant, a first referring URL, a first checkout URL, and a first user identification data responsive to the user device navigating to the first checkout URL via the first referring URL; receiving first transaction authorization data comprising a second timestamp, second user identification data associated with a first attempted transaction with the first merchant, wherein the second user identification data comprises a first virtual card number; determining whether the first timestamp is within a predetermined period of the second timestamp and whether the first user identification data corresponds with the second user identification data; and responsive to determining that the first timestamp is within the predetermined period of the second timestamp and the first user identification data corresponds with the second user identification data, storing the first virtual card number associated with the first referring URL and the first checkout URL in a database.

Clause 16: The method of clause 15, further comprising: receiving, via the web browser plugin on the user device, a third timestamp associated with second click data at a second website associated with a second merchant, a second referring URL, a second checkout URL, and third user identification data responsive to the user device navigating to the second checkout URL via the second referring URL; determining whether the second referring URL and the second checkout URL have second domains that respectively match first domains of the first referring URL and the first checkout URL; based on the second referring URL and the second checkout URL having the second domains that respectively match the first domains of the first referring URL and the first checkout URL beyond a predetermined matching threshold, causing the web browser plugin of the user device to display, in a dynamic GUI, the first virtual card number for use in completing a second attempted transaction; and based on the second referring URL or the second checkout URL having the second domains that do not respectively match the first domains of the first referring URL and the first checkout URL beyond the predetermined matching threshold, generating a second virtual card number for use in completing the second attempted transaction.

Clause 17: The method of clause 16, further comprising responsive to determining that the first timestamp is not within the predetermined period of the second timestamp or the first user identification data does not correspond with the second user identification data, associating the first attempted transaction as a card-on-file transaction and cause the dynamic GUI to display a card-on-file indication.

Clause 18: The method of clause 16, wherein the first user identification data comprises single sign on identification data (SSOID).

Clause 19: The method of clause 18, wherein the third user identification data comprises the SSOID.

Clause 20: The method of clause 19, wherein the second user identification data comprises account number, name, and/or address associated with a first user and the first attempted transaction. The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    one or more processors; and
    a memory in communication with the one or more processors and storing instructions that, when executed by the one or more processors, are configured to cause the system to:
        cause a web browser plugin on a user device to monitor website navigation on the user device and generate a first timestamp based on click data detected in association with the user device navigating to a first checkout uniform resource location (URL) via a first referring URL, wherein the first referring URL is associated with a first website associated with a first merchant;
        cause the web browser plugin on the user device to detect that the user device has navigated to the first checkout URL via the first referring URL by identifying one or more payment fields on a web page associated with the first checkout URL;
        responsive to the web browser plugin detecting that the user device has navigated to the first checkout URL via the first referring URL, receive, via the web browser plugin on the user device, the first timestamp, the first referring URL, the first checkout URL, and first user identification data;
        receive first transaction authorization data comprising a second timestamp and second user identification data associated with a first attempted transaction with the first merchant, wherein the second user identification data comprises a first virtual card number;
        determine whether (i) the first timestamp is within a predetermined period of the second timestamp and (ii) the first user identification data corresponds with the second user identification data;
        responsive to determining that the first timestamp is within the predetermined period of the second timestamp and the first user identification data corresponds with the second user identification data, store the first virtual card number associated with the first referring URL and the first checkout URL in a database;
        receive, via the web browser plugin on the user device, a third timestamp associated with second click data at a second website associated with a second merchant, a second referring URL, a second checkout URL, and third user identification data responsive to the user device navigating to the second checkout URL via the second referring URL;
        determine whether the second referring URL and the second checkout URL have second domains that respectively match first domains of the first referring URL and the first checkout URL beyond a predetermined matching threshold;
        based on the second referring URL and the second checkout URL having the second domains that respectively match the first domains of the first referring URL and the first checkout URL beyond the predetermined matching threshold, cause the web browser plugin of the user device to suggest and display, in a dynamic graphical user interface (GUI), the first virtual card number and prepopulate at least one credit card field associated with the second checkout URL with the first virtual card number; and
        based on the second referring URL or the second checkout URL having the second domains that do not respectively match the first domains of the first referring URL and the first checkout URL beyond the predetermined matching threshold, generate a second virtual card number for display via the dynamic GUI and prepopulate the at least one credit card field associated with the second checkout URL with the second virtual card number.

2. The system of claim 1, wherein the instructions are further configured to cause the system to:
    responsive to determining that the first timestamp is not within the predetermined period of the second timestamp or the first user identification data does not correspond with the second user identification data, associate the second referring URL and the second checkout URL with a card-on-file transaction and update the dynamic GUI to include a card-on-file indication.

3. The system of claim 1, wherein the instructions are further configured to cause the system to:

cause the web browser plugin on the user device to transmit the first timestamp, the referring URL, the first checkout URL and the first user identification data in response to identifying the one or more payment fields on the web page associated with the first checkout URL.

4. The system of claim 1, wherein the first user identification data comprises single sign on identification data (SSOID).

5. The system of claim 4, wherein the third user identification data comprises the SSOID.

6. The system of claim 5, wherein:
the SSOID of first user identification data is linked to one or more first account numbers,
the second user identification data comprises an account number, a name, and/or an address associated with a first user and the first attempted transaction, and
determining that the first user identification data corresponds with the second user identification data further comprises matching the account number of the second user identification data to the one or more first account numbers of the SSOID of the first user identification data beyond a predetermined identification matching threshold.

7. The system of claim 1, wherein the instructions are further configured to cause the system to:
responsive to the second referring URL and the second checkout URL having the second domains that respectively match the first domains of the first referring URL and the first checkout URL beyond the predetermined matching threshold, receive, via the dynamic GUI, a first selection from the user device, indicating the suggested first virtual card number.

8. The system of claim 1, wherein the click data detected in association with the user device navigating from to the first checkout URL via the first referring URL comprises data indicating that a user of the user device has clicked on a checkout button on the first website associated with the first merchant.

9. A system comprising:
one or more processors; and
a memory in communication with the one or more processors and storing instructions that, when executed by the one or more processors, are configured to cause the system to:
cause a web browser plugin on a user device to monitor website navigation on the user device and generate a first timestamp based on click data detected in association with the user device navigating to a first checkout uniform resource location (URL) via a first referring URL, wherein the first referring URL is associated with a first website associated with a first merchant;
cause the web browser plugin on the user device to detect that the user device has navigated to the first checkout URL via the first referring URL by identifying one or more payment fields on a web page associated with the first checkout URL;
responsive to the web browser plugin detecting that the user device has navigated to the first checkout URL via the first referring URL, receive, via the web browser plugin on the user device, the first timestamp, the first referring URL, and the first checkout URL;
determine whether the first referring URL and the first checkout URL have first domains that respectively match previous domains of a previous referring URL and a previous checkout URL beyond a predetermined matching threshold; and
based on the first referring URL and the first checkout URL having the first domains that respectively match the previous domains of the previous referring URL and the previous checkout URL beyond the predetermined matching threshold, cause the web browser plugin of the user device to suggest and display, in a dynamic graphical user interface (GUI), a first virtual card number associated with the previous domains and prepopulate at least one credit card field associated with the first checkout URL with the first virtual card number.

10. The system of claim 9, wherein the instructions are further configured to cause the system to:
based on the first referring URL or the first checkout URL having the first domains that do not respectively match the previous domains of the previous referring URL and the previous checkout URL beyond the predetermined matching threshold, generate a second virtual card number associated with the first domains of the first referring URL and the first checkout URL and cause the dynamic GUI to display the second virtual card number.

11. The system of claim 9, wherein the instructions are further configured to cause the system to:
cause the web browser plugin on the user device to transmit the first timestamp, the first referring URL, the first checkout URL and first user identification data in response to identifying the one or more payment fields on the web page associated with the first checkout URL.

12. The system of claim 9, wherein the instructions are further configured to cause the system to:
receive, via the web browser plugin, first user identification data;
receive an attempted transaction with associated attempted transaction data comprising the first virtual card number and a second timestamp;
determine whether (i) the first timestamp is within a predetermined period of the second timestamp, (ii) the first user identification data corresponds with the first virtual card number, and (iii) the first referring URL and the first checkout URL have first domains that respectively match previous domains of the previous referring URL and the previous checkout URL beyond a predetermined matching threshold; and
responsive to determining that (i) the first timestamp is not within the predetermined period of the second timestamp, (ii) the first user identification data does not correspond with the first virtual card number, or (iii) the first referring URL and the first checkout URL have first domains that do not respectively match previous domains of the previous referring URL and the previous checkout URL beyond a predetermined matching threshold, generate a second virtual card number and cause the dynamic GUI to display the second virtual card number.

13. The system of claim 12, wherein the first user identification data comprises single sign on identification data (SSOID).

14. The system of claim 9, wherein the previous referring URL and the previous checkout URL are retrieved from a database.

15. A method, comprising:
causing a web browser plugin on a user device to monitor website navigation on the user device and generate a first timestamp based on click data detected in association with the user device navigating to a first checkout uniform resource location (URL) via a first referring URL, wherein the first referring URL is associated with a first website associated with a first merchant;

causing the web browser plugin on the user device to detect that the user device has navigated to the first checkout URL via the first referring URL by identifying one or more payment fields on a web page associated with the first checkout URL;

responsive to the web browser plugin detecting that the user device has navigated to the first checkout URL via the first referring URL, receiving, via the web browser plugin on the user device, the first timestamp, the first referring URL, the first checkout URL, and first user identification data;

receiving first transaction authorization data comprising a second timestamp, second user identification data associated with a first attempted transaction with the first merchant, wherein the second user identification data comprises a first virtual card number;

determining whether the first timestamp is within a predetermined period of the second timestamp and whether the first user identification data corresponds with the second user identification data;

responsive to determining that the first timestamp is within the predetermined period of the second timestamp and the first user identification data corresponds with the second user identification data, storing the first virtual card number associated with the first referring URL and the first checkout URL in a database;

receiving, via the web browser plugin on the user device, a third timestamp associated with second click data at a second website associated with a second merchant, a second referring URL, a second checkout URL, and third user identification data responsive to the user device navigating to the second checkout URL via the second referring URL;

determining whether the second referring URL and the second checkout URL have second domains that respectively match first domains of the first referring URL and the first checkout URL;

based on the second referring URL and the second checkout URL having the second domains that respectively match the first domains of the first referring URL and the first checkout URL beyond a predetermined matching threshold:

causing the web browser plugin of the user device to suggest and display, in a dynamic graphical user interface (GUI), the first virtual card number;

receiving, via the dynamic GUI, a first selection from the user device; and responsive to the first selection indicating the first virtual card number, prepopulate at least one credit card field associated with the second checkout URL with the first virtual card number; and based on the second referring URL or the second checkout URL having the second domains that do not respectively match the first domains of the first referring URL and the first checkout URL beyond the predetermined matching threshold, generating and displaying in the dynamic GUI a second virtual card number and prepopulate the at least one credit card field associated with the second checkout URL with the first virtual card number.

16. The method of claim 15, further comprising responsive to determining that the first timestamp is not within the predetermined period of the second timestamp or the first user identification data does not correspond with the second user identification data, associating the first attempted transaction as a card-on-file transaction and cause the dynamic GUI to display a card-on-file indication.

17. The method of claim 15, wherein the first user identification data comprises single sign on identification data (SSOID).

18. The method of claim 17, wherein the third user identification data comprises the SSOID.

19. The method of claim 18, wherein the second user identification data comprises account number, name, and/or address associated with a first user and the first attempted transaction.

20. The method of claim 19, wherein:
the SSOID of first user identification data is linked to one or more first account numbers, and
determining that the first user identification data corresponds with the second user identification data further comprises matching the account number of the second user identification data to the one or more first account numbers of the SSOID of the first user identification data beyond a predetermined identification matching threshold.

* * * * *